United States Patent
Hwang et al.

(10) Patent No.: US 11,879,508 B2
(45) Date of Patent: Jan. 23, 2024

(54) CLUTCH FOR PREVENTING BACKDRIVE

(71) Applicants: Hyundai Motor Company, Seoul (KR); Kia Corporation, Seoul (KR)

(72) Inventors: Sang Woo Hwang, Seoul (KR); Youngil Sohn, Yongin-Si (KR); Sehyun Chang, Suwon-Si (KR); Min Jun Kim, Busan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/071,319

(22) Filed: Nov. 29, 2022

(65) Prior Publication Data

US 2023/0296143 A1    Sep. 21, 2023

(30) Foreign Application Priority Data

Mar. 15, 2022  (KR) .......................... 10-2022-0031737

(51) Int. Cl.
  *F16D 41/04*  (2006.01)
  *F16D 27/01*  (2006.01)
  *F16D 43/202*  (2006.01)

(52) U.S. Cl.
  CPC ............. *F16D 41/04* (2013.01); *F16D 27/01* (2013.01); *F16D 43/2028* (2013.01)

(58) Field of Classification Search
  CPC ............... F16D 41/00–16; F16D 27/01; F16D 27/00–14; F16D 43/00–30;
  (Continued)

(56) References Cited

U.S. PATENT DOCUMENTS 2,995,226 A * 8/1961 Gilder ...................... F16B 1/04
192/223.1
3,400,795 A * 9/1968 Miller ................. F16D 43/2028
192/56.42
(Continued)

FOREIGN PATENT DOCUMENTS

JP    2019138410 A    8/2019
JP    2019203530 A    11/2019
(Continued)

OTHER PUBLICATIONS

G. Mathijssen, et al., "Novel Lockable and Stackable Compliant Actuation Unit for Modular+ SPEA Actuators", in IEEE Robotics and Automation Letters, vol. 4, No. 4, pp. 4445-4451, Oct. 2019, doi: 10.1109/LRA.2019.2937479.

*Primary Examiner* — David R Morris
(74) *Attorney, Agent, or Firm* — MORGAN, LEWIS & BOCKIUS LLP

(57) ABSTRACT

A clutch for preventing backdrive, includes a housing: a cover portion positioned on one end portion of the housing; an external shaft, at least one portion of which is positioned inside the housing, the other end portion thereof passing through the housing; a rocker positioned between the housing and the cover portion and fastened to the external shaft; an input shaft, one end portion thereof being inserted into an opening portion in the locker, and the other end portion thereof passing through the cover portion; and a gear portion positioned on the housing or the cover portion so that a serrated portion positioned on the locker is selectively brought into contact with the gear portion, wherein rotation of the rocker is restricted so that the external shaft is rotated along a rotation direction of the input shaft.

12 Claims, 7 Drawing Sheets

(58) Field of Classification Search
CPC ......... F16D 43/2028; F16D 43/20–218; F16D 67/00–02
See application file for complete search history.

(56) References Cited

U.S. PATENT DOCUMENTS

| | | |
|---|---|---|
| 5,205,386 A | 4/1993 | Goodman et al. |
| 5,582,279 A | 12/1996 | Buchanan, Jr et al. |
| 2002/0079182 A1 | 6/2002 | Kettler |

FOREIGN PATENT DOCUMENTS

| | | |
|---|---|---|
| JP | 2020133868 A | 8/2020 |
| JP | 2021036158 A | 3/2021 |
| KR | 1020020020760 A | 3/2002 |
| WO | WO 2019216280 A1 | 11/2019 |
| WO | WO 2020008738 A1 | 1/2020 |
| WO | WO 2021054479 A1 | 3/2021 |

* cited by examiner

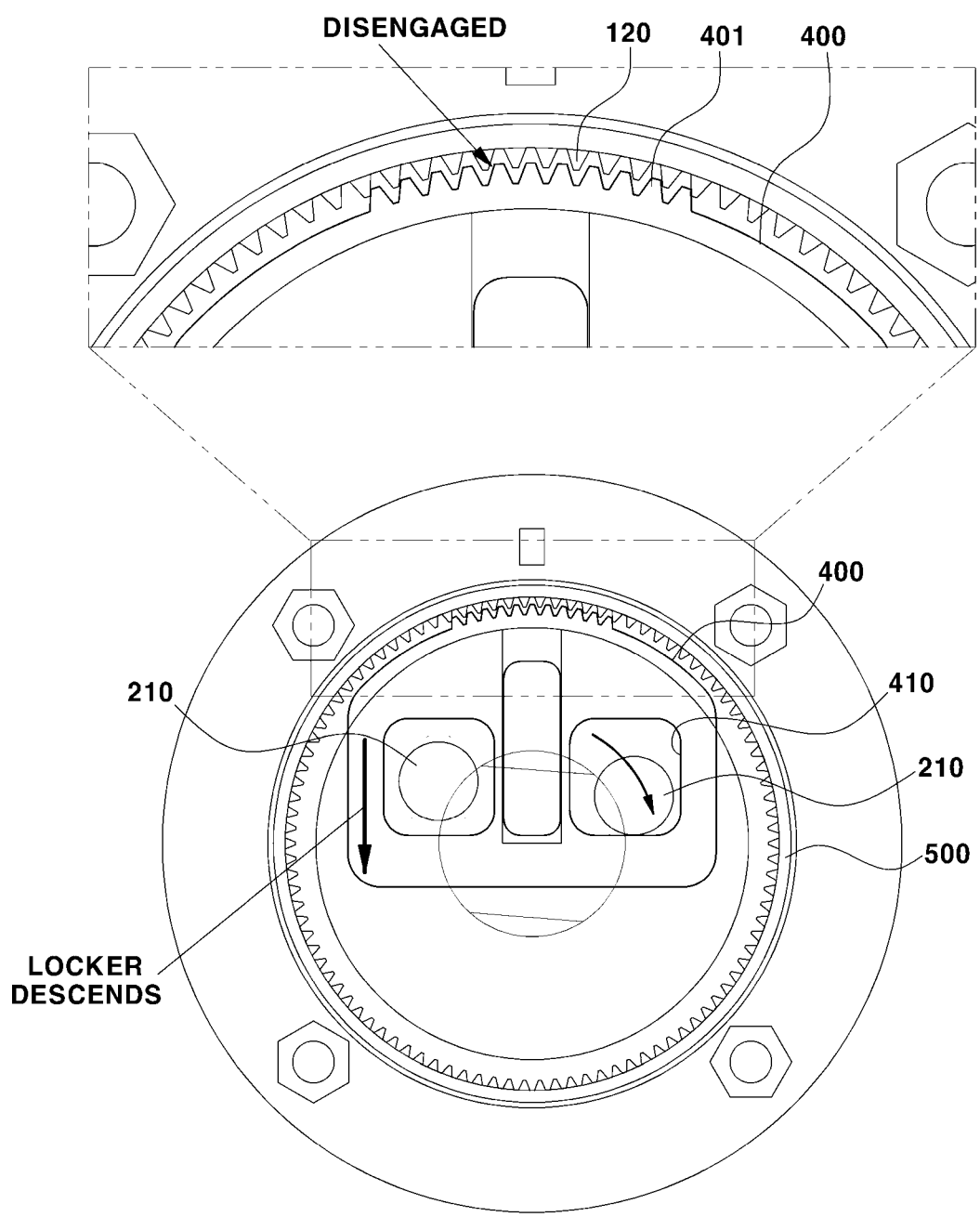

CLUTCH FOR PREVENTING BACKDRIVE

CROSS-REFERENCE TO RELATED APPLICATION

The present application claims priority to Korean patent application No. 10-2022-0031737 filed on Mar. 15, 2022, the entire contents of which is incorporated herein for all purposes by this reference.

BACKGROUND OF THE PRESENT DISCLOSURE

Field of the Present Disclosure

The present disclosure relates to a clutch for preventing backdrive, and more particularly, to a clutch for preventing backdrive by an input shaft using a locker formed between an input shaft and an external shaft when a driving force is not applied.

Description of Related Art

Normally, a driving force is transferred through a clutch. For transferring the driving force, a configuration is employed in which a rotation force is selected from a motor or an engine to which a driving force is applied. For instance, in a motor with a worm and a gear, when external torque is applied to an output terminal of a gear arrangement, there is a need to prevent the worm and the gear from entering a backdrive state.

When a load is connected to this motor, driving torque acts on a motor output drive unit under a specific condition. This torque is transferred from a drive gear to a worm shaft, and may cause an angular motion on a motor armature (backdrive).

Constituent elements for transferring the driving force are configured to stop operating as a user intends, when this situation is reached, but when the backdrive occurs, rotation may occur in a direction opposite to a direction in which the driving force is transferred.

Usually, a backdrive condition is controlled by reducing the gearing efficiency of the clutch. However, there occur disadvantages, such as a need for substituting a relatively high-capacity motor for driving, and a decrease in the driving efficiency of an entire system.

Therefore, there appears a need for configuring a clutch configured for selectively transferring a rotation force of a drive unit to an external shaft.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a clutch configured for preventing backlash or backdrive in a state where a driving force is not applied.

Another object of the present disclosure is to provide a clutch configured for preventing backdrive by driving an input shaft at high efficiency in a forward direction and maintaining a clutch-locked state when driving the input shaft in a reverse direction.

Yet another object of the present disclosure is to provide a clutch configured so that a locker is brought into contact with an internal surface of a housing to deal with a rotation force applied from an external shaft and that torque transferred to an external shaft is thus not applied to the input shaft.

Yet another object of the present disclosure is to provide a clutch configured to prevent backdrive by performing precise control through a locket fastened to an input shaft.

The present disclosure is not limited to the above-described objectives. Objectives other than the above-described objectives would be clearly understood from the following descriptions of embodiments of the present disclosure. In addition, the objects of the present disclosure will be accomplished by limitations recited in the claims or combinations thereof.

To accomplish the above-mentioned objectives of the present disclosure, the clutch for preventing backdrive employs the following configurations.

According to an aspect of the present disclosure, there is provided a clutch for preventing backdrive, the clutch including: a housing: a cover portion positioned on one end portion of the housing; an external shaft at least one portion of which is positioned inside the housing, a first end portion thereof passing through the housing, and a second end portion thereof being fastened to a locker; an input shaft, a first end portion thereof to be inserted into an opening portion in the locker, and a second end portion thereof passing through the cover portion; a gear portion positioned on the housing or the cover portion so that a serrated portion positioned on the locker is selectively brought into contact with the gear portion; and a magnetic unit providing a force so that the gear portion is brought into contact with the serrated portion, wherein the external shaft and the locker are configured to be rotated along a rotation direction of the input shaft, and a gear portion is configured to be brought into contact with the serrated portion by the magnetic unit to deal with rotation of the external shaft, and thus to restrict the rotation of the locker.

The clutch may further include: a protrusion positioned on one surface of the locker facing the external shaft; and a guide portion positioned on the external shaft facing the locker and configured so that the protrusion is fastened thereto.

In the clutch, the guide portion of the external shaft may be formed to extend over a long distance along one direction with respect to the central axis of the external shaft, and the protrusion may be configured to have a length corresponding to a length of the guide portion.

In the clutch, the magnetic unit may include: a steel portion positioned on an internal circumferential surface of the housing or the cover portion; and a magnetic unit positioned on an external surface of the locker facing the steel portion.

In the clutch, when a rotation force of the input shaft is not applied, the magnetic portion positioned on the locker may be positioned adjacent to the steel portion, and the serrated portion of the locker may be configured to be fastened to the gear portion.

The clutch may further include: a position determination pin positioned on one surface of the cover portion facing the housing; and a position determination hole configured so that the position determination pin is inserted thereinto, the position determination hole being positioned on one surface of the housing.

In the clutch, when a rotation force of the input shaft is not applied, one end portion of the input shaft positioned on the locker may be configured so that a movement of the one end portion is restricted by the opening portion.

In the clutch, when a driving force of the input shaft is applied, the locker may be configured so that the serrated portion is spaced a distance away from the gear portion and that the locker and the output shaft are rotated by a rotation force of the input shaft.

In the clutch, the input shaft may include: a rotational-force transfer portion inserted into each of the opening portions formed in the locker; and a driving-force transfer portion protruding from the outside of the cover portion.

In the clutch, two rotational-force transfer portions may be inserted into two opening portions, respectively, that are positioned in the locker, being positioned therein.

In the clutch, the rotational-force transfer portion may be configured to have an arc-shaped cross section, and the opening portion positioned in the locker may correspond to a shape of the rotational-force transfer portion and may have a relatively larger-sized cross section than the rotational-force transfer portion.

In the clutch, when a driving force of the input shaft is not applied, one surface of the opening portion adjacent to an external shaft and the rotational-force transfer portion may be configured to be brought into contact with each other and thus to regulate a movement of the input shaft.

In the clutch, when a driving force of the input shaft is applied, the serrated portion and the gear portion are configured to be disengaged with each other and thus to move the locker.

According to an exemplary embodiment of the present disclosure, the following advantageous effects are obtained through the exemplary embodiment described above and through configurations, combinations, and application-based relationships that will be described below.

According to an exemplary embodiment of the present disclosure, the locker fastened to the input shaft is configured to be selectively brought into contact with the internal surface of the housing. Thus, the advantageous effect of precisely preventing backlash or backdrive may be achieved.

In addition, according to an exemplary embodiment of the present disclosure, the locker transfers the driving force to the external shaft in conjunction with the input shaft. Thus, the advantageous effect of providing the high efficiency of energy transfer may be achieved.

Furthermore, in a backlash or backdrive state where the input shaft is driven in a reverse direction, the rotation of the input shaft may be restricted. Thus, the advantageous effect of performing precise position control may be achieved.

Moreover, the clutch in which the rotating force is not transferred to the input shaft to deal with application of torque from the external shaft is provided. Thus, the advantageous effect of improving the durability of the clutch may be achieved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5A is a view exemplarily illustrating that a driving force is applied to the locker in a state where the driving force of the input shaft is applied, as an exemplary embodiment of the present disclosure;

Figure 1:
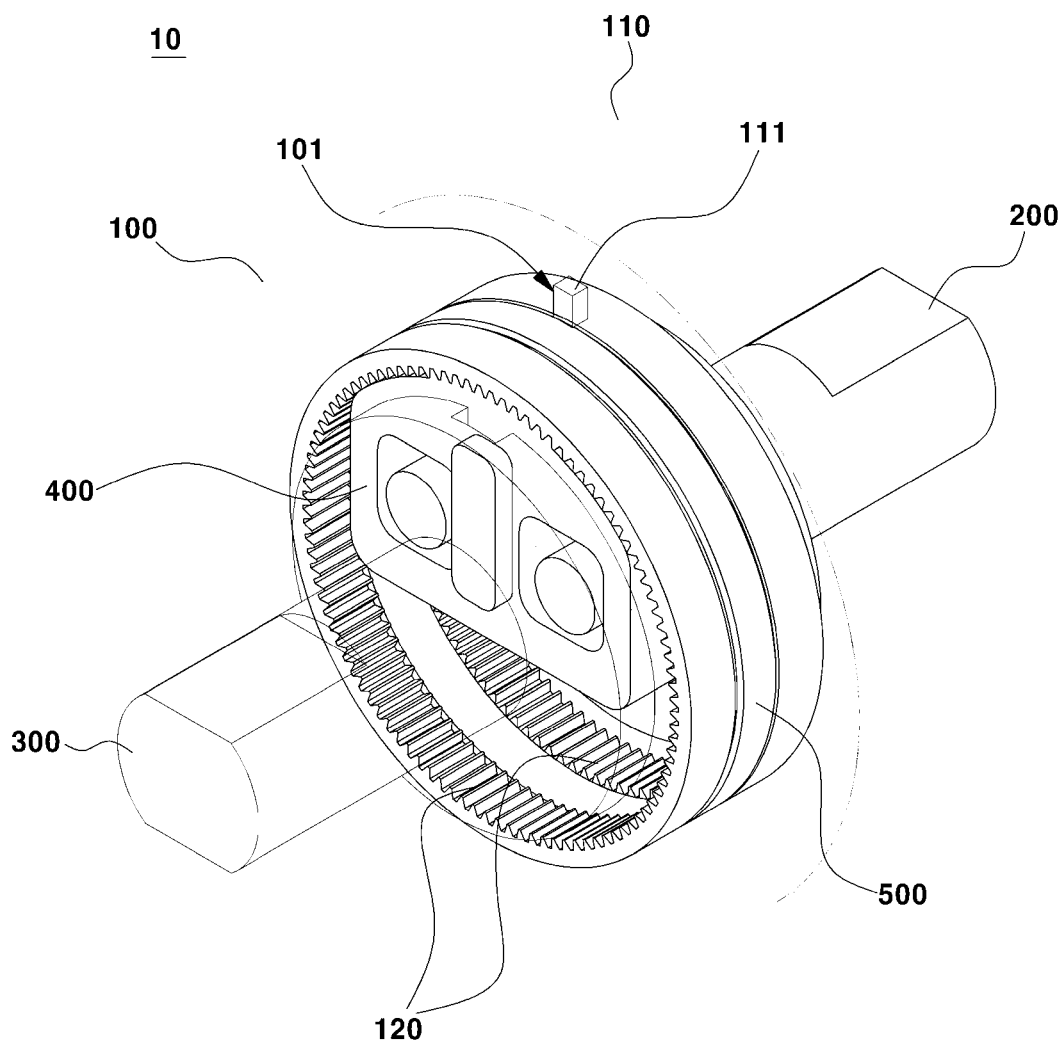
FIG. 1 is a perspective view exemplarily illustrating a clutch for preventing backdrive as an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

An exemplary embodiment of the present disclosure will be described in more detail below with reference to the accompanying drawings. The exemplary embodiment of the present disclosure will be modified in various forms, and the scope of the present disclosure may not be interpreted as being limited to the following embodiment. The exemplary embodiment of the present disclosure is described in sufficient detail to enable a person of ordinary skill in the art to make and use the present disclosure.

The term "unit", "module", or the like, which is used throughout the specification, means an individual component that performs at least one function or operation and may be realized in hardware, software, or a combination of both.

The terms used in the present specification are only for describing a specific embodiment and are not intended to impose any limitation on the present disclosure. A noun in singular form has the same meaning as when used in plural form, unless it has a different meaning in context.

In addition, when constituent elements have the same name, the terms input, outer, and the like are used to distinguish among such constituent elements. In the following description, the present disclosure is not necessarily limited to this order: input and outer.

In the following description that is provided with reference to the accompanying drawings, the same constituent elements or constituent elements corresponding to each other are provided the same reference numeral, and descriptions of constituent element that have the same reference numeral are not repeated.

In addition, a "backdrive" that is used to refer to one phenomenon in the present specification may be construed as having the same meaning as a "backlash." The backdrive means a state where a movement is caused in a direction opposite to a rotation direction in a state where a driving force is not applied to an input shaft 200.

Furthermore, a clutch 10 for preventing backdrive according to an exemplary embodiment of the present disclosure may be fastened to all constituent elements that are configured for applying a rotation force with the input shaft 200. In an exemplary embodiment of the present disclosure, the input shaft 200 is fastened to a motor, and the motor is configured so that the rotation force in the clockwise direction is applied.

Figure 2:
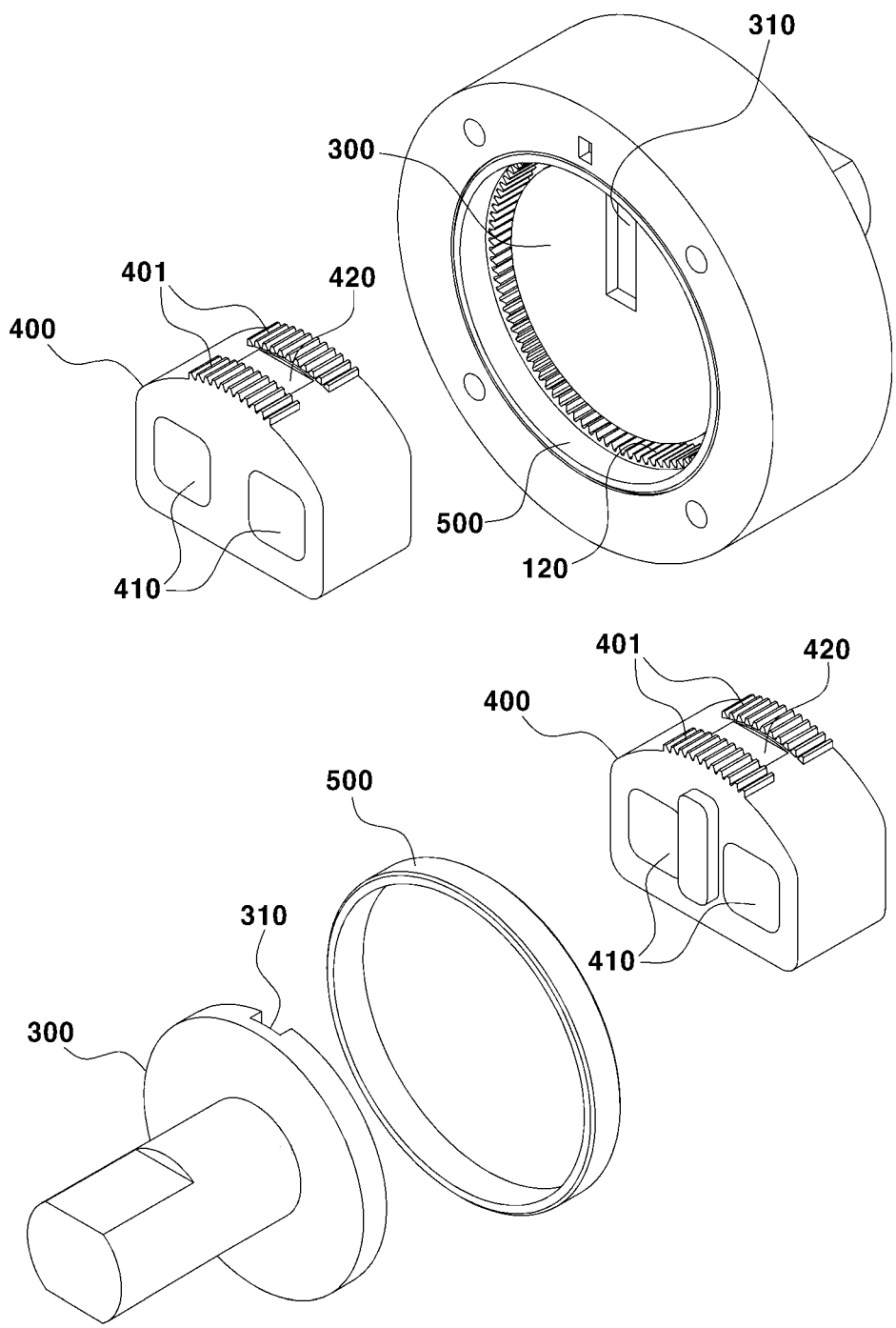
FIG. 2 is a view exemplarily illustrating that an external shaft and a locker of the clutch for preventing backdrive are combined with each other as an exemplary embodiment of the present disclosure.
Figure 3:
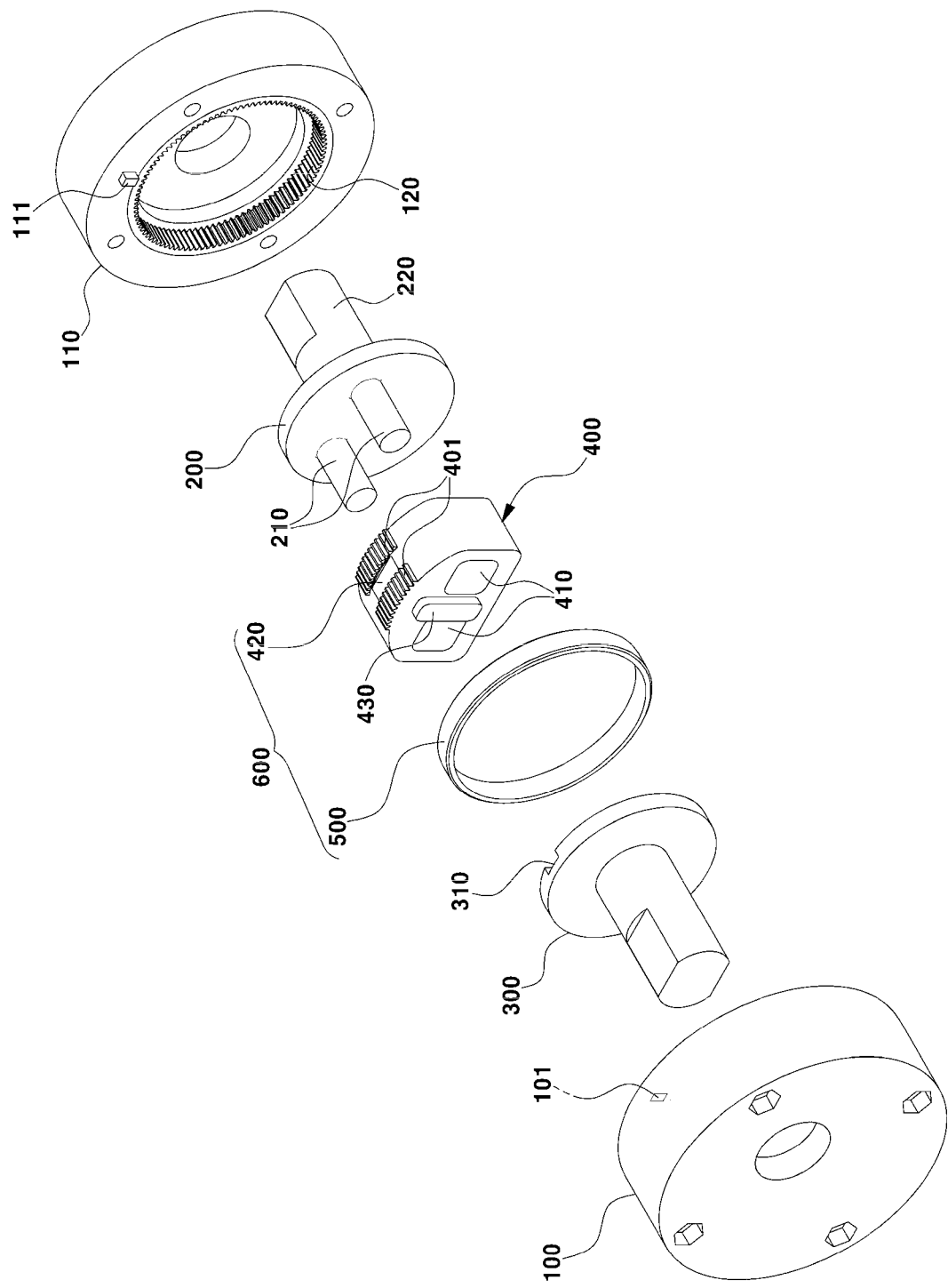
FIG. 3 a view exemplarily illustrating a configuration of the clutch for preventing backdrive as an exemplary embodiment of the present disclosure.

FIG. 1, FIG. 2, and FIG. 3 are views each illustrating a configuration relationship between constituent elements of the clutch 10 for preventing backdrive, as an exemplary embodiment of the present disclosure.

As illustrated, the clutch 10 for preventing backdrive includes a housing 100. The housing 100 includes a cover portion 110 at one end portion thereof that is open. The cover portion 110 is configured to surround the one end portion of the housing 100. The housing 100 has a circular cross section, and the cover portion 110 is configured to surround all opening portions at the one end portion of the housing 100.

The clutch 10 includes an external shaft 300 that passes through the other end portion of the housing 100 and forms one flat surface inside the housing 100. The clutch 10 includes a locker 400 inside the housing 100. The locker 400 is fastened to the external shaft 300. The clutch 10 includes an input shaft 200. One end portion of the input shaft 200 is inserted into an opening portion 410 positioned in the locker 400. The external shaft 300 is configured to be fastened to the locker 400 positioned inside the housing 100. Therefore, the locker 400 facing the external shaft 300 includes a protrusion 430 positioned at one surface thereof. Furthermore, the external shaft 300 includes a guide portion 310 at one surface thereof. The guide portion 310 is configured to correspond to the protrusion 430.

The protrusion 430 is formed to extend over a long distance along one direction with respect to a central axis of the external shaft 300, and the guide portion 310 has a shape corresponding to the protrusion 430. Furthermore, in an exemplary embodiment of the present disclosure, the protrusion 430 may be configured to be fixedly inserted into the guide portion 310, and the protrusion 430 and the guide portion 310 are configured to be fastened to each other so that the locker 400 and the external shaft 300 are rotated with each other. Therefore, the protrusion 430 and the guide portion 310 are not limited in shape.

A position determination pin 111 is positioned on one surface of the cover portion facing the housing and a position determination hole 101 is configured so that the position determination pin is inserted thereinto, the position determination hole being positioned on one surface of the housing.

The input shaft 200 is configured so that at least one portion in a lengthwise direction thereof is inserted into the opening portion 410 positioned in the locker 400. The input shaft 200 includes a driving-force transfer portion 220 at the other end portion thereof. The driving-force transfer portion 220 passes through the cover portion 110 and protrudes from the outside of the cover portion 110. The driving-force transfer portion 220 is configured to be fastened to a drive unit applying the rotation force and thus to be rotated with the driver unit in a rotation direction of the driver unit.

Furthermore, a configuration where the rotation force of the drive unit is applied to the driving-force transfer portion 220 positioned at the other end portion of the input shaft 200 is employed, and a configuration where the driving force applied to the driving-force transfer portion 220 is transferred to a rotational-force transfer portion 210 by which the external shaft 300 is rotated is employed. More desirably, the drive unit is configured to transfer the driving force by which the input shaft 200 is rotatable, and the locker 400 is configured to rotate the external shaft 300 to deal with a rotation force of the input shaft 200. In an exemplary embodiment of the present disclosure, the drive unit fastened to the input shaft 200 is configured as a motor.

In addition, the clutches 10 according to an exemplary embodiment of the present disclosure include all types of clutches 10 that may be configured to be fastened to the motor. The clutch according to an exemplary embodiment of the present disclosure may be positioned at one end portion of a motor configured to apply a driving force of a vehicle, one end portion of a motor for causing a window to ascend and descend, one end portion of a motor for inputting a steering angle of an independent corner module, or one end portion of a posture control drive motor for controlling a posture of a vehicle frame. In addition, the clutch 10 according to an exemplary embodiment of the present disclosure may be used as a clutch 10, as a drive unit, that is fastened to an engine and transfers the driving force in one direction between a gear portion of a transmission and the engine.

The input shaft 200 includes the rotational-force transfer portion 210 that is inserted into the opening portion 410 formed in the locker 400. Therefore, in an exemplary embodiment of the present disclosure, one locker 400 includes two opening portions 410 formed therein, and the input shaft 200 includes two rotational-force transfer portions 210 corresponding to the two opening portions 410, respectively. The rotational-force transfer portions 210 may be kept inserted into the opening portions 410, respectively, that are formed in the locker 400. Furthermore, the rotational-force transfer portion 210 is configured to be rotated in the same direction as the driving-force transfer portion 220, and the locker 400 brought into contact with the rotational-force transfer portion 210 through the opening portion 410 is configured to be rotated with the input shaft 200 to deal with a rotation direction of the input shaft 200.

In another exemplary embodiment of the present disclosure, the rotational-force transfer portion 210 may be configured to have the shape of an arc, and the opening portion 410 is configured as a groove that is relatively greater than that of the rotational-force transfer portion 210 so that a state where the rotational-force transfer portion 210 is inserted may be maintained.

Furthermore, in the case of the rotational-force transfer portion 210 configured to have the shape of an arc, the following configuration is employed. The locker 400 is moved to a position adjacent to an internal circumferential surface of the housing 100, and thus a serrated portion 401 positioned on the top portion of the locker 400 is fastened to a gear portion 120 positioned on the internal circumferential surface of the housing 100 or an internal circumferential surface of the cover portion 110. When this is done, one surface of the opening portion 410 may be kept connected to the rotational-force transfer portion 210.

The locker 400 is positioned inside the housing 100 and is configured to be fastened to the external shaft 300. The locker 400 includes the serrated portion 401 on the outside thereof. The serrated portion 401 is formed at a position corresponding to the gear portion 120 positioned on the housing 100 or the cover portion 110. Furthermore, the locker 400 may be provided with a magnetic force from a magnetic portion 420. Thus, by the magnetic force, the locker 400 may be selectively brought into contact with the internal circumferential surface of the housing 100. The serrated portion 401 positioned on the outside of the locker 400 is configured to be selectively fastened to the gear portion 120.

More desirably, the serrated portion 401 may be positioned to both sides of the magnetic portion 420 positioned at the center of an external surface of the locker 400 and may be positioned adjacent to the gear portion 120 positioned inside the housing 100 or the cover portion 110.

In addition, the clutch 10 includes a magnetic unit 600 providing a magnetic force so that the gear portion 120 and the serrated portion 401 approach each other. The magnetic unit 600 includes the magnetic portion 420 positioned on an external circumferential surface of the locker 400 and a steel portion 500 positioned on an internal circumferential surface of the housing 100 or the cover portion 110. Therefore, the gear portion 120 positioned on the locker 400 is fastened to the serrated portion 401 by the magnetic force generated between the magnetic portion 420 and the steel portion 500, and is configured to restrict rotation of the locker 400.

That is, the rotational-force transfer portion 210 is configured to unfasten the locker 400 and the internal circumferential surface of the housing 100 when the rotation force of the drive unit is transferred to the input shaft 200. Therefore, the serrated portion 401 of the locker 400 and the gear portion 120 are moved for unfastening. The locker 400 is rotated so that the rotation force of the input shaft 200 is transferred to the external shaft 300.

The housing 100 includes the steel portion 500 on the internal circumferential surface thereof, and the locker 400 includes the magnetic portion 420 on the external circumferential surface thereof. Therefore, when the rotation force of the input shaft 200 is not applied, the magnetic portion 420 of the locker 400 may be moved to a position close to the internal circumferential surface of the housing 100. Furthermore, the clutch 10 includes the gear portion 120 adjacent to the steel portion 500 and positioned close to an internal circumferential surface of the housing 100 or the cover portion 110. Therefore, the serrated portion 401 formed on the external surface of the locker 400 is moved by the magnetic force to a position for contact with the gear portion 120, and waits for a movement of the input shaft 200.

In addition, in a state where the rotation force of the input shaft 200 is not applied, when a rotation force of the external shaft 300 is applied, the serrated portion 401 of the locker 400 and the gear portion 120 also switch to a fastened state. Therefore, the locker 400 switches to a state of being locked inside the housing 100, and thus can prevent the rotation force from being transferred to the input shaft 200.

The locker 400 and the housing 100 may be configured so that the internal circumferential surfaces thereof are spaced a predetermined distance apart, depending on a position of the locker 400. Therefore, in a state where a driving force of the input shaft 200 is not applied, the external circumferential surface of the locker 400 is moved by a magnetic force of the magnetic portion 420 to a position adjacent to the internal circumferential surface of the housing 100. Thus, the serrated portion 401 and the gear portion 120 are brought into contact with each other, and the locker 400 switches to a locked state.

Conversely, when the input shaft 200 is rotated, the rotational-force transfer portion 210 of the input shaft 200 is brought into contact with one end portion in the widthwise direction of the opening portion 410 of the locker 400, being positioned therein and may apply a rotation force so that the locker 400 is rotated in the direction of the rotation force of the drive unit. In the instant case, a distance between the internal circumferential surface of the housing 100 and the external circumferential surface of the locker 400 is maximally increased. Therefore, a repulsive force between the locker 400 and the housing 100 does not occur to deal with rotation of the input shaft 200, and the locker 400 is positioned in a state of being rotatable together with the external shaft 300.

As described above, the clutch 10 for preventing backdrive according to an exemplary embodiment of the present disclosure may have the following configuration. The locker 400, spaced away from the internal circumferential surface of the housing 100, is rotated with the external shaft 300 to deal with the input shaft 200 that is rotated in a direction that is the same as a direction of the rotation force applied from the drive unit. Moreover, when the rotation force is not applied to the input shaft 200, the gear portion 120 and the serrated portion 401 of the locker 400 are brought into contact with each other, and thus restrict a movement of the input shaft 200, preventing a backdrive phenomenon.

Figure 4:
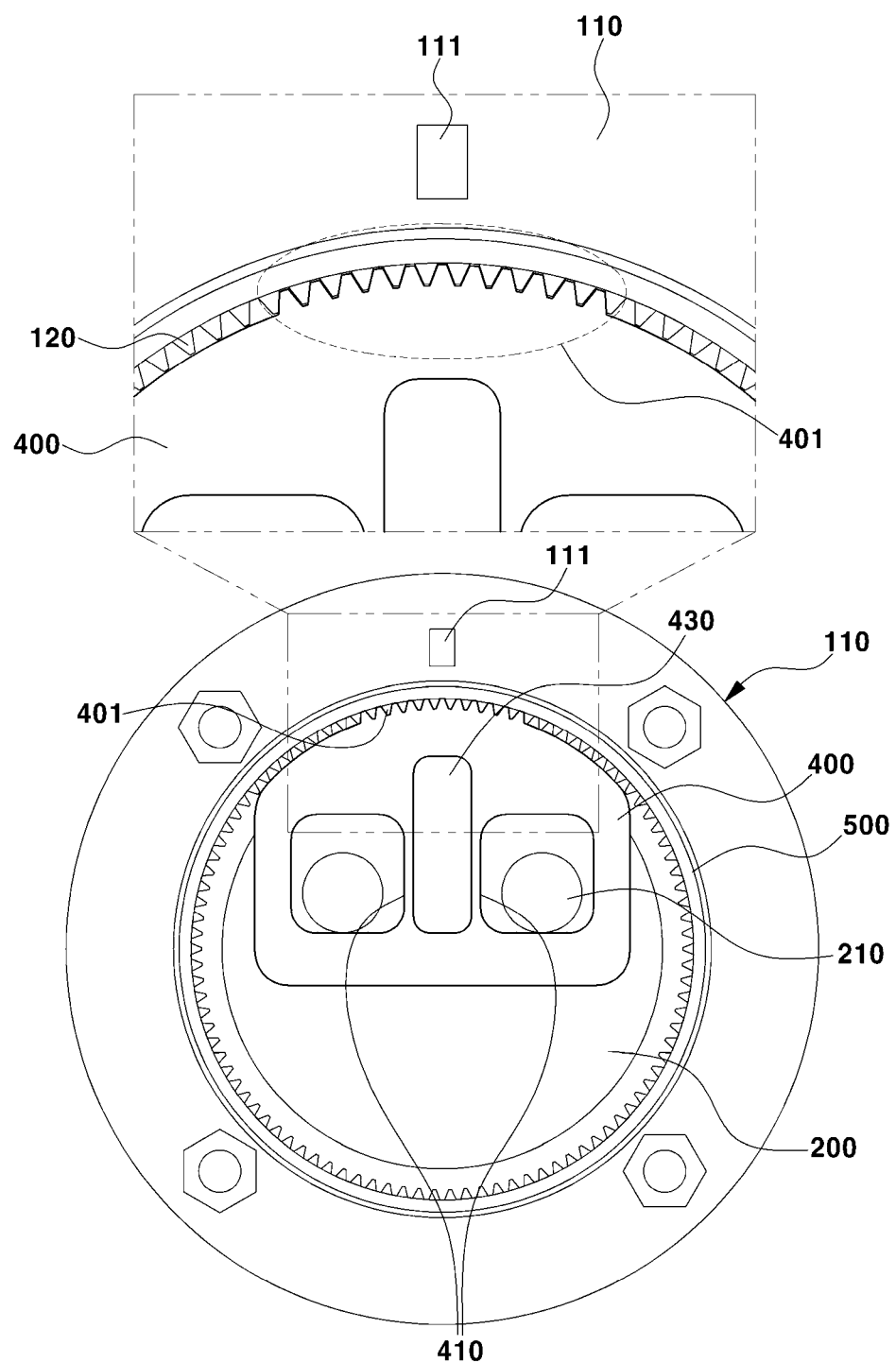
FIG. 4 is a view exemplarily illustrating a combination relationship among constituent elements of the clutch for preventing backdrive in a state where a driving force of an input shaft is not applied, as an exemplary embodiment of the present disclosure.

FIG. 4 is a view exemplarily illustrating a fastening relationship between the serrated portion 401 of the locker 400 and the gear portion 120 in a state where the driving force of the input shaft 200 is not applied.

As illustrated, the locker 400 is positioned between the inside of the housing 100 and the cover portion 110 and includes the serrated portion 401 formed on at least one portion of the external surface thereof. More desirably, the magnetic portion 420 may be positioned adjacent to a position in a lengthwise direction of the serrated portion 401 of the locker 400. When the external surface of the locker 400 and the internal circumferential surface of the housing 100 are closest to each other, the magnetic portion 420 may be spaced a minimum distance away from the steel portion 500. Therefore, the minimum distance between the magnetic portion 420 and the steel portion 500 may be determined according to a height at which the serrated portion 401 and the gear portion 120 are fastened to each other.

When the drive force of the input shaft 200 is not applied, the locker 400 is moved, by the magnetic force of the magnetic unit 420 positioned on the outside of the locker 400, to a position adjacent to the steel portion 500 positioned on the internal circumferential surface of the housing 100.

When the locker 400 is moved to a position adjacent to the internal circumferential surface of the housing 100, the rotational-force transfer portion 210 of the input shaft 200 that is inserted into the opening portion 410 switches to a state of being brought into contact with one surface of the opening portion 410 positioned adjacent to the central axis of the external shaft 300. At the same time, the serrated portion 401 of the locker 400 is configured to be engaged with the gear portion 120 and thus to prevent a rotation of the locker 400. Moreover, the serrated portion 401 is configured to restrict rotation of the rotational-force transfer portion 210 brought into contact with one surface of the opening portion 410.

That is, a configuration is employed where in a state where the rotation of the locker 400 is restricted, the rotation of the rotational-force transfer portion 210 positioned inside the opening portion 410 is restricted, restricting the backdrive by the input shaft 200. As illustrated in the cross-sectional view, the locker 400 is configured to move upward in the height direction and to fasten the serrated portion 401 of the locker 400 and the gear portion 120 positioned on the housing 100 or the cover portion 110.

In this manner, the locker 400 is configured to switch, by the magnetic force, to a state of being close to the internal circumferential surface of the housing 100 and to be brought into contact with the external surface of the locker 400, restricting a rotation of the input shaft 200. That is, the locker 400 and the housing 100 may be kept brought into contact with each other so that rotation of the input shaft 200 is restricted in a state where the rotation force of the input shaft 200 is not applied.

Figure 5B:
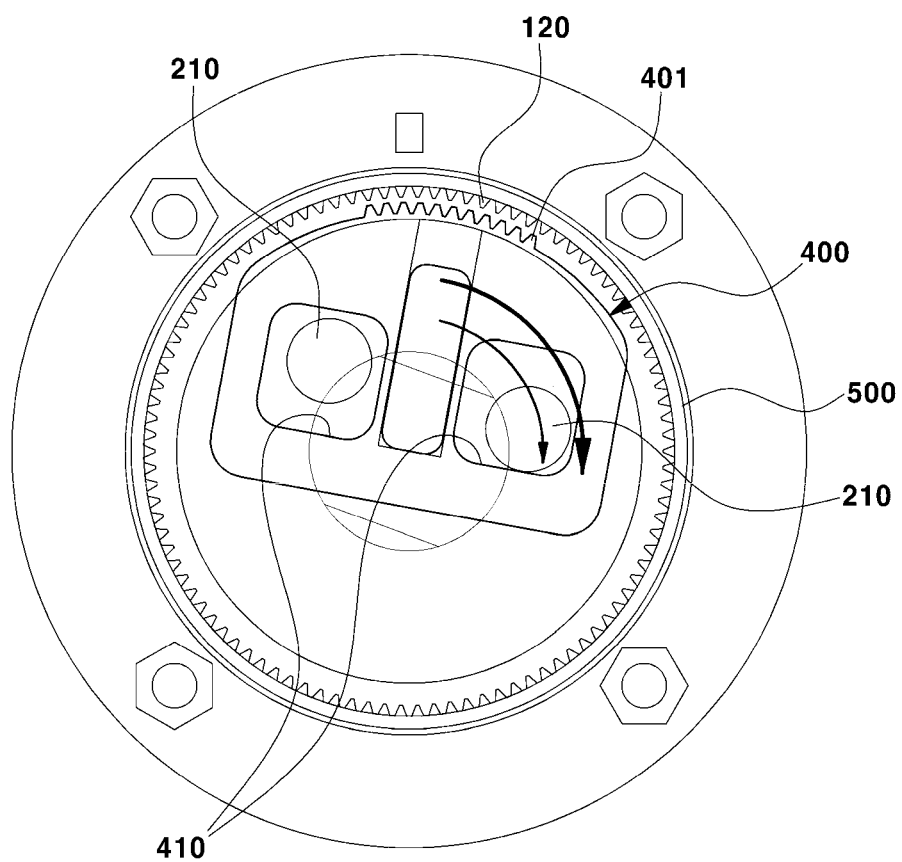
FIG. 5B is a view exemplarily illustrating a configuration of the clutch for preventing backdrive in a state where the driving force of the input shaft is applied, as an exemplary embodiment of the present disclosure.
Figure 5C:
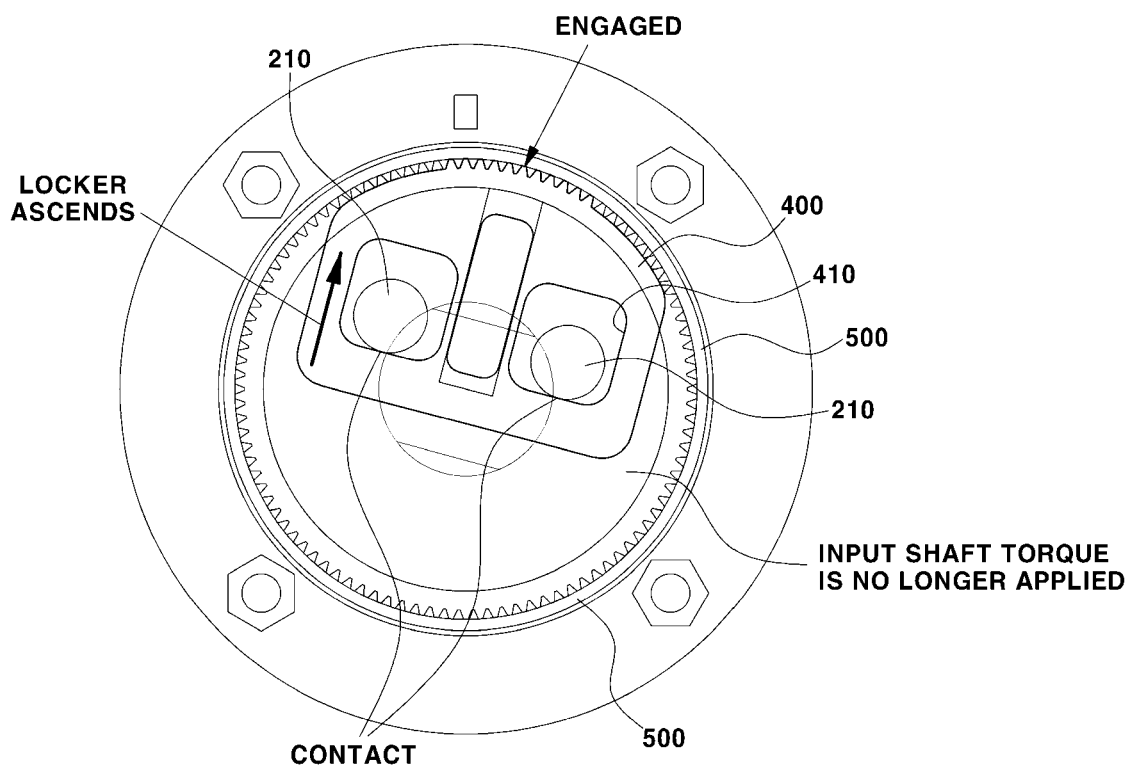
FIG. 5C is a view illustrate that the external shaft is rotated in a state where the driving force of the input shaft is applied, as an exemplary embodiment of the present disclosure.

By contrast, FIG. 5A, FIG. 5B, and FIG. 5C are views each illustrating a configuration where the rotation force of the input shaft 200 is applied and where the locker 400 and the external shaft 300 are rotated with each other.

As illustrated in FIG. 5A, the rotational-force transfer portion 210 of the input shaft 200 positioned in each of the opening portions 410 in the locker 400 is configured to initially press the opening portion 410 along the rotation direction of the input shaft 200 when a rotation force of the motor is applied to the input shaft 200 from the drive unit that is fastened to the driving-force transfer portion 220 of the input shaft 200.

The opening portion 410 is configured so that the opening portion 410, when pressed, moves the locker 400 in a direction in which the serrated portion 401 of the locker 400 and the gear portion 120 are disengaged from each other. Therefore, the locker 400 switches to a state of being spaced a distance away from the internal circumferential surface of the housing 100 and being rotatable.

In an exemplary embodiment of the present disclosure, the clutch 10, including the input shaft 200 including two rotational-force transfer portions 210, and the locker 400, including two opening portions 410 corresponding to the two rotational-force transfer portions 210, respectively, are illustrated. Furthermore, the rotational-force transfer portion 210 close to a position positioned in a rotation direction is configured to press one surface of a lower end portion of the opening portion 410 when a rotation force is applied to the rotational-force transfer portion 210. Therefore, the locker 400 may be moved downwards along a pressing direction of the opening portion 410. More desirably, a configuration is employed where the opening portion 410 to which a force is applied in a tangential direction from the rotational-force transfer portion 210 positioned at the position in the rotation direction is moved in a direction in which the locker 400 is moved farther away from the internal circumferential surface of the housing 100 or the cover portion 110. A configuration is employed where a force that is applied to the opening portion 410 is the same as the sum of a force in the vertical direction that causes the locker 400 to be moved farther away from the gear portion 120 and a force in the horizontal direction that causes the locker 400 to be rotated.

As illustrated in FIG. 5A, the rotation force that is transferred through the driving-force transfer portion 220 is transferred to the locker 400 through the rotational-force transfer portion 210. Therefore, the locker 400 is configured to be moved, in a direction which the serrated portion 401 and the gear portion 120 are disengaged from each other by the rotation force of the rotational-force transfer portion 210, in a state where the serrated portion 401 and the gear portion 120 are initially engaged with each other.

In this manner, the locker 400 that is spaced a distance away from the internal circumferential surfaces of the housing 100 and the cover portion 110 is configured to be rotated with the external shaft 300 fastened thereto with the protrusion 430 in between. That is, as illustrated in FIG. 5B, a configuration is employed where the rotational-force transfer portion 210, the locker 400, and the external shaft 300 are rotated with each other along a direction in which the rotation force is applied from the drive unit.

In this manner, a configuration is employed where the rotation force that is applied to the rotational-force transfer portion 210 of the input shaft 200 is transferred to the locker 400 and the external shaft 300 without undergoing interference with the internal circumferential surface of the housing 100.

FIG. 5C illustrates a case where the input shaft 200, the locker 400, and the external shaft 300 are subsequently rotated with each other by the rotation force of the input shaft 200 and then where the rotation force is not applied from the drive unit.

As illustrated, in a state where the rotation force of the drive unit is not applied, a magnetic force is applied so that the magnetic portion 420 positioned on the locker 400 is moved to a position adjacent to the steel portion 500. Accordingly, the serrated portion 401 of the locker 400 is moved to a position for fastening to the gear portion 120.

Furthermore, a configuration is employed where one surface of the opening portion 410 close to the central axis of the external shaft 300 and the rotational-force transfer portion 210 are brought into contact with each other. Therefore, a rotational movement of the rotational-force transfer portion 210 is restricted by the opening portion 410 in the locker 400.

Therefore, a configuration is employed where in a state where the driving force is not applied, a repulsive force due to the engagement of the gear portion 120 and the serrated portion 401 with each other cancels out a rotation force applied from the external shaft 300 to the locker 400, as well as a rotation force applied from the input shaft 200 to the locker 400. That is, a configuration is employed where in a state where the gear portion 120 and the serrated portion 401 are combined with each other, the locker 400 switches to the locked state by the housing 100 and the cover portion 110 and where a rotation force between the input shaft 200 and the external shaft 300 is not transferred.

Figure 6:
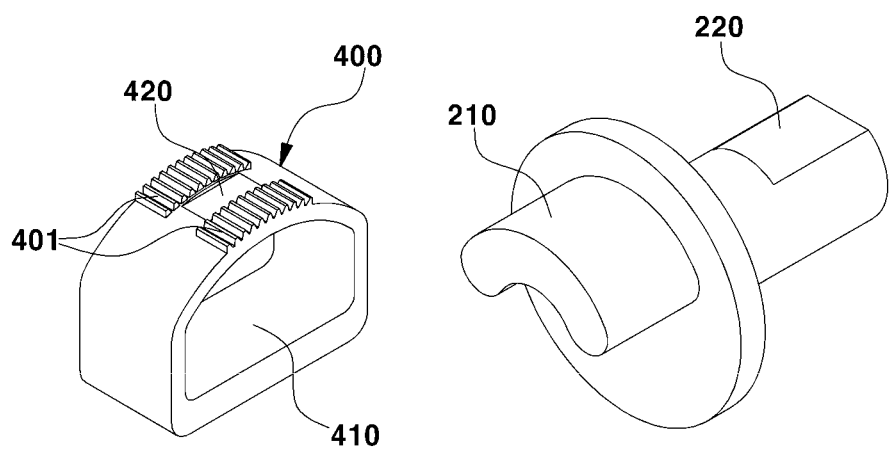
FIG. 6 is a view exemplarily illustrating a configuration of the input shaft including a rotational-force transfer portion in the shape of an ellipse that is fastened to the locker, as another exemplary embodiment of the present disclosure.

FIG. 6 is a view exemplarily illustrating a configuration of the clutch 10 for preventing backdrive, in which the rotational-force transfer portion 210 has an arc-shaped cross section, as another exemplary embodiment of the present disclosure.

As another exemplary embodiment of the present disclosure, the rotational-force transfer portion 210 may be configured to have an arc-shaped cross section. The opening portion 410 in the locker 400 into which the rotational-force transfer portion 210 is inserted has a relatively larger-sized cross section than the rotational-force transfer portion 210 so that the rotational-force transfer portion 210 is inserted into the opening portion 410.

Furthermore, a configuration is employed where the opening portion 410 has one end portion thereof corresponding to a shape of the rotational-force transfer portion 210 and where when the serrated portion 401 and the gear portion 120 are engaged with each other, one surface of the opening portion 410 that is adjacent to the central axis of the external shaft 300 is kept brought into contact with one surface of a lower end portion in the height direction of the rotational-force transfer portion 210.

The rotational-force transfer portion 210 including an arc-shaped cross section is configured so that when the driving force of the drive unit is applied to the driving-force transfer portion 220, one end portion of the rotational-force transfer portion 210 presses one end portion in the rotation direction of the opening portion 410 and thus causes the locker 400 to be moved farther away from the internal circumferential surface of the housing 100. In addition, the external shaft 300 and the locker 400 are configured to be rotated with each other by the rotation force of the rotational-force transfer portion 210 in a state where the locker 400 is spaced a distance away from the internal circumferential surface of the housing 100, The guide portion 310 of the external shaft 300 is configured to be fastened to the protrusion 430 on the locker 400 and thus to be rotated with the locker 400. Therefore, the locker 400 and the external shaft 300 are configured to be rotated with the rotational-force transfer portion 210 by the driving force applied from the driving-force transfer portion 220 of the input shaft 200.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A clutch for preventing backdrive, the clutch comprising:
    a housing:
    a cover portion positioned on one end portion of the housing;
    an external shaft at least one portion of which is positioned inside the housing, a first end portion thereof passing through the housing, and a second end portion thereof being fastened to a locker;
    an input shaft, a first end portion thereof to be inserted into an opening portion in the locker, and a second end portion thereof passing through the cover portion;
    a gear portion positioned on the housing or the cover portion so that a serrated portion positioned on the locker is selectively brought into contact with the gear portion; and
    a magnetic unit providing a force so that the gear portion is brought into contact with the serrated portion,
    wherein the external shaft and the locker are configured to be rotated along a rotation direction of the input shaft, and
    wherein the gear portion is brought into contact with the serrated portion by the magnetic unit to deal with rotation of the external shaft, and thus configured to restrict the rotation of the locker.

2. The clutch of claim 1, further including:
    a protrusion positioned on one surface of the locker facing the external shaft; and
    a guide portion positioned on the external shaft facing the locker, wherein the protrusion is fastened to the guide portion.

3. The clutch of claim 2, wherein the guide portion of the external shaft is formed to extend over a long distance along a radial direction of the external shaft, and the protrusion is configured to be slidable along the guide portion.

4. The clutch of claim 1, wherein the magnetic unit includes:
    a steel portion positioned on an internal circumferential surface of the housing or the cover portion; and
    a magnetic unit positioned on an external surface of the locker facing the steel portion.

5. The clutch of claim 4, wherein when a rotation force of the input shaft is no longer applied, the magnetic portion positioned on the locker is positioned adjacent to the steel portion, and the serrated portion of the locker is fastened to the gear portion.

6. The clutch of claim 1, further including:
    a position determination pin positioned on one surface of the cover portion facing the housing; and
    a position determination hole into which the position determination pin is inserted, the position determination hole being positioned on one surface of the housing.

7. The clutch of claim 1, wherein when a rotation force of the input shaft is not applied, the first end portion of the input shaft positioned on the locker is configured so that a movement of the first end portion is restricted by the opening portion.

8. The clutch of claim 1, wherein when a driving force of the input shaft is applied, the locker is configured so that the serrated portion is spaced a distance away from the gear portion and that the locker and the output shaft are rotated by a rotation force of the input shaft.

9. The clutch of claim 1, wherein the input shaft includes:
    a rotational-force transfer portion inserted into each of the opening portions formed in the locker; and
    a driving-force transfer portion protruding from the outside of the cover portion.

10. The clutch of claim 9, wherein two rotational-force transfer portions are inserted into two opening portions, respectively, that are positioned in the locker.

11. The clutch of claim 9, wherein the rotational-force transfer portion has an arc-shaped cross section, and the opening portion positioned in the locker corresponds to a shape of the rotational-force transfer portion and has a relatively larger-sized cross section than the rotational-force transfer portion.

12. The clutch of claim 9, wherein when a driving force of the input shaft is not applied, one surface of the opening portion and the rotational-force transfer portion are configured to be brought into contact with each other and thus to regulate a movement of the input shaft.

* * * * *